United States Patent
Mendez

[15] 3,677,284
[45] July 18, 1972

[54] FUEL TRANSFER SYSTEM FOR TRACTOR TRAILER VEHICLES

[72] Inventor: Charles E. Mendez, P. O. Box 426, Tampa, Fla. 33601

[22] Filed: Oct. 6, 1966

[21] Appl. No.: 584,867

[52] U.S. Cl.............................137/351, 137/265, 137/572, 137/567, 280/5
[51] Int. Cl.......................................................F17d 1/00
[58] Field of Search.................137/351, 394, 566, 567, 572, 137/255, 265; 280/5

[56] References Cited

UNITED STATES PATENTS

| | | | |
|---|---|---|---|
| 2,481,135 | 9/1949 | Maness et al. | 280/5 X |
| 2,535,301 | 12/1950 | Le Tourneau | 280/5 |
| 2,818,915 | 1/1958 | Pfeiffer | 137/255 |
| 2,021,394 | 11/1935 | Wade | 137/566 X |
| 3,229,712 | 1/1966 | Perkins | 137/394 |
| 3,288,238 | 11/1966 | Lindsey | 137/567 X |

Primary Examiner—John P. McIntosh
Attorney—Cushman, Darby & Cushman

[57] ABSTRACT

A relatively large auxiliary fuel supply tank is carried by a trailer of a tractor-trailer combination. A fuel supply system provides for a transfer of fuel from the large, separate tank of the trailer to a point of consumption for an engine carried by the tractor of the combination. In one embodiment, fuel can be transferred from the separate fuel tank to the engine itself by a conventional fuel pump carried by the engine, and in another embodiment fuel can be transferred from the separate fuel tank into one or more small-capacity fuel tanks carried by the tractor. Automatic control means are provided for maintaining a desired level of fuel in the small-capacity fuel tanks in the second embodiment.

6 Claims, 3 Drawing Figures

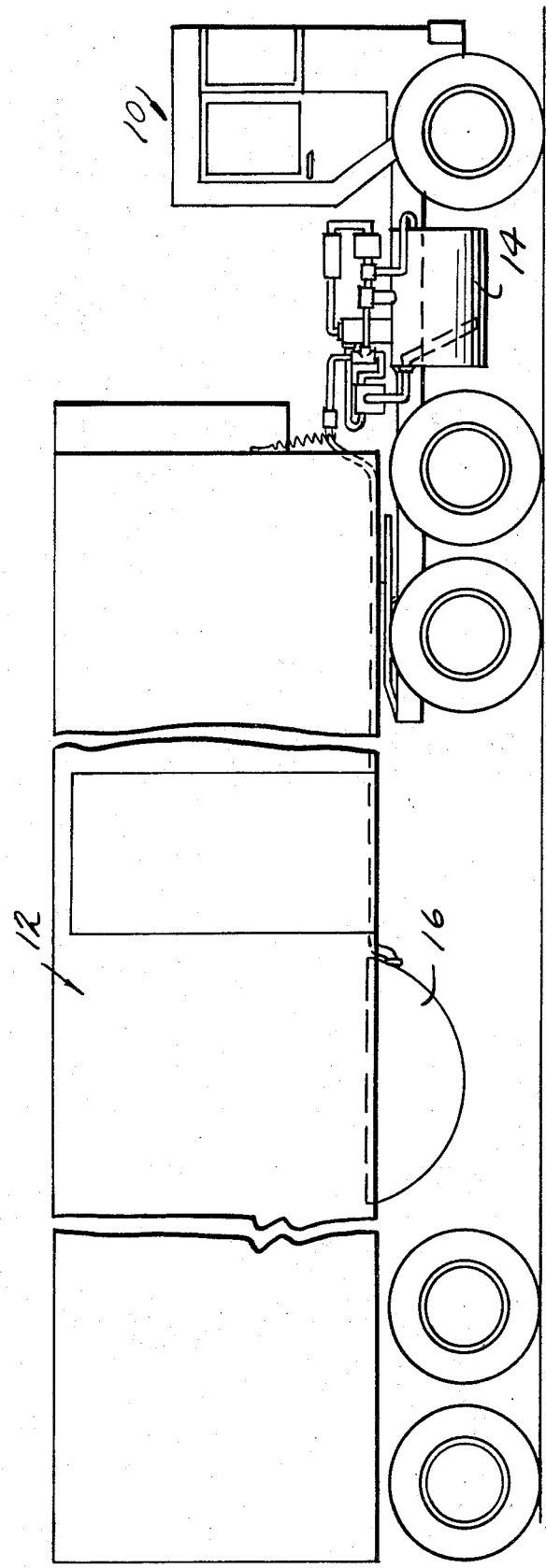

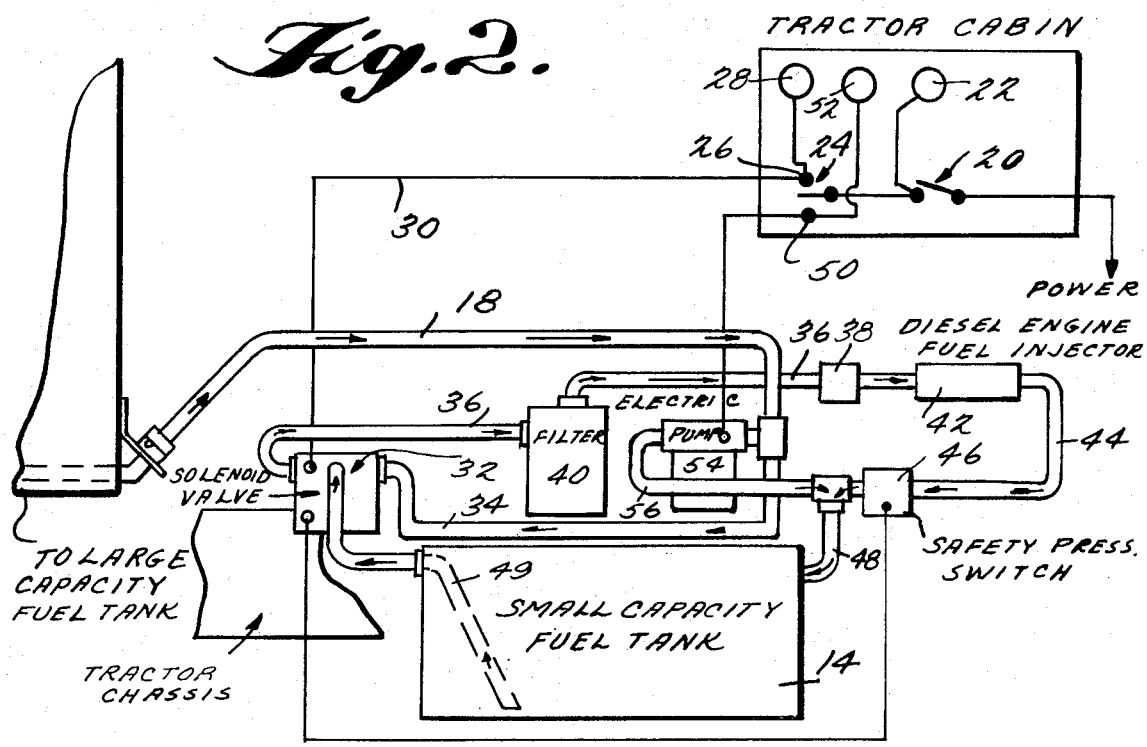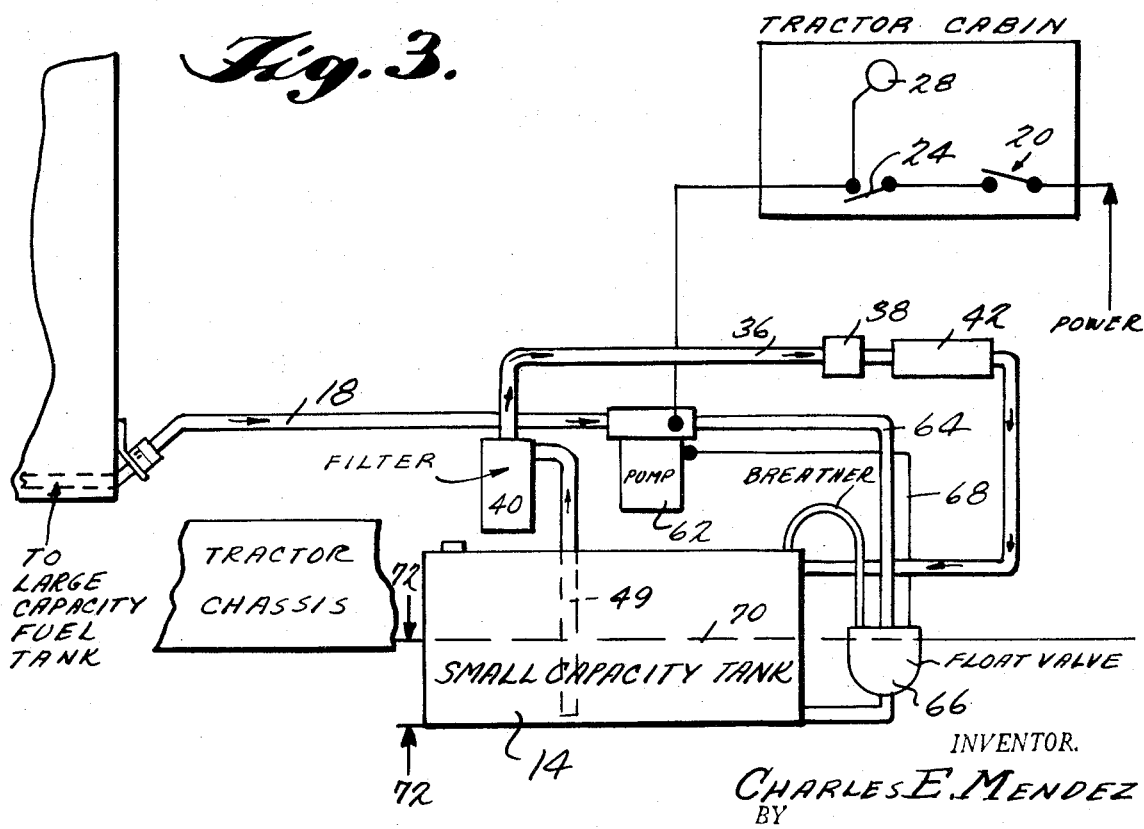

FUEL TRANSFER SYSTEM FOR TRACTOR TRAILER VEHICLES

This invention relates to a system for providing an auxiliary fuel supply for motor vehicles of a type which pull trailers. The invention is more specifically concerned with providing an auxiliary fuel tank on a trailer unit of a tractor trailer combination, and a transferring meanS is provided for transferring fuel from the auxiliary tank to a point of consumption in the tractor unit of the combination.

Tractor trailer units normally include a diesel or gasoline powered tractor vehicle for drawing or pulling a trailer unit. The tractor vehicle carries one or more fuel tanks for supplying diesel or other fuel to the internal combustion engine which is associated with the vehicle. Since such vehicles are most often used for long distance hauls, it is necessary for a driver to make periodic stops to refuel the tanks of the tractor unit. On long distance hauls, the refueling cannot always be planned to take place at an ideal time, and often it is necessary for truckers to refuel at remote points where prices may be inflated to take advantage of the known necessity to stop at such locations. As a result, the cost of the haul is increased appreciably, and there is always a possibility that the fuel which is available is not of a desired quality or grade. These problems are especially noticeable in the case of vehicles which require diesel fuel for their operation and which accordingly must stop at only places handling that type of fuel.

The present invention provides a substantially increased range for a tractor trailer unit by placing a relatively large auxiliary tank on the trailer portion of the unit. Further, the invention provides for a transferring means for either manually or automatically transferring fuel from the auxiliary tank to its point of consumption in the engine of the tractor vehicle. By placing the auxiliary tank on the trailer of the combination, it is possible to carry a much larger tank and a much larger quantity of fuel than would be safely possible if auxiliary tanks or larger tanks were merely added to the tractor vehicle itself. In one embodiment, the transferring means of this invention includes a system for actuating the transfer of fuel from the auxiliary tank into the usual tank (or tanks) of the tractor. This system is operated manually in response to a signal to the driver of the vehicle which indicates a depletion of fuel in the regular tractor tanks. A second embodiment of a transferring system includes pumping means and control means for automatically maintaining a desired level of fuel in the usual fuel tanks of the tractor vehicle. This system requires an automatic movement of fuel from the auxiliary tank on the trailer to the tank or tanks carried by the vehicle. The automatic system may further be made operational or inoperative by a manual switching means connected in the ignition circuit of the vehicle. Finally, the invention provides for a third transferring arrangement wherein fuel is carried directly to the point of consumption without being first transferred into the regular fuel tanks of the fuel. This system includes pumping and control means to cause the required transfer of fuel from the auxiliary tank, and an overflow arrangement is provided for returning excess fuel to the regular vehicle tanks in order to prevent an excessive build-up of pressure within the transferring system.

These and other features of the invention will be discussed in greater detail below where reference will be made to the accompanying drawings in which:

FIG. 1 illustrates a side elevational view of a tractor trailer combination having an auxiliary tank and transferring means mounted thereon;

FIG. 2 diagrammatically illustrates a transferring means and its associated control means for transferring fuel from an auxiliary tank on a trailer directly to a point of consumption without first passing through a fuel tank carried by a tractor vehicle; and FIG. 3 illustrates schematically a transferring means and its associated control means for automatically maintaining a predetermined level of fuel in a vehicle fuel tank by transferring required quantities of fuel from an auxiliary tank carried by a trailer.

Referring to FIG. 1, a tractor trailer combination is illustrated, and the combination includes the usual tractor vehicle 10 and a load carrying trailer unit 12. The trailer is connected to the tractor in any well-known manner, and this invention is not concerned with the particular arrangement of a fifth wheel or whatever other means may be used for coupling a trailer unit to a tractor unit. The tractor unit is self-propelled and includes a conventional internal combustion engine for providing motive power to the tractor unit. The internal combustion engine may be either gasoline or diesel fuel consuming, but the further description of this invention will make reference to diesel powered tractors since the non-availability of diesel fuel most often presents special problems to truckers. The tractor unit includes one or more small fuel tanks 14 which are of a usual construction and capacity for being carried by a tractor vehicle. An auxiliary fuel tank of relatively large capacity, as compared to the regular tanks 14, is illustrated as being attached to the trailer unit 12. The capacity of the auxiliary fuel tank 16 may be 600 gallons or more, and in the past it has been impossible to safely carry such a relatively large quantity of fuel in a tractor trailer combination. Past attempts to add additional tanks to tractor vehicles presented safety problems when very large quantities of fuel were carried by the vehicle itself, and further, it has been impossible to carry as much as 600 additional gallons of fuel on a tractor unit because of the weight distribution problems which would exist with such an arrangement. With the present invention, it is possible to safely carry a relatively large quantity of additional fuel in an auxiliary tank which is positioned to maintain a desired weight distribution for a loaded tractor trailer combination. By carrying additional fuel, substantial savings in fuel purchases on long distance hauls are appreciated.

The invention further provides for transferring systems for moving fuel from the auxiliary tank 16 to a point of consumption (that is, the internal combustion engine) in the tractor vehicle. The transferring systems may be of several types, as will be discussed with reference to the embodiments of FIGS. 2 and 3.

FIG. 2 illustrates a system for transferring fuel from the auxiliary tank 16 of the trailer to a diesel engine in the tractor. The system carries fuel directly to the engine without a necessity for first introducing the fuel into the relatively small capacity tanks carried on the tractor vehicle. However, the illustrated system delivers sufficient fuel from the auxiliary tank to not only provide for immediate engine needs but also to provide an excess of fuel which can be carried through an overflow system into the regular fuel tank 14 for filling the same. Alternatively, the FIG. 2 system can be operated to directly fill the small capacity tank 14, and fuel is then consumed from that tank through the usual supply system to the engine. Either of the methods of operating the FIG. 2 system are controlled by the driver, or other occupant, of the tractor vehicle, and in this sense the systems may be considered as manually operated to the extent that it requires a driver actuation to effect a transfer of fuel from the auxiliary tank.

Considering first the system for carrying fuel directly to the point of consumption, there is provided a switching means 20 which may be included in the ignition circuit of the vehicle for opening and closing electrical circuits required for operating the transferring means. The switch 20 is driver operated, and upon closing the switch an indicator light 22 is lighted to indicate the operational condition of the system. Then, the driver actuates a switch 24 which is a three way switch having an off position (as illustrated) and two separate closed positions which actuate separate systems for delivering fuel from the auxiliary tank. If the switch is closed with the contact 26, an indicator light 28 is lighted and a circuit 30 is completed for operating a solenoid valve 32. The solenoid valve 32 is of a well-known construction which provides for alternative fluid passageways through the valve. When the valve circuit 30 is closed by the switch 24, the valve is actuated to open a flow path between the conduit 34 leading into the valve 32 and the conduit 36 leading out of the valve 32. When this passageway is opened, fuel is drawn from the auxiliary tank through a flexible hose 18 by the action of a conventional mechanical fuel pump 38 which is connected to a conduit leading from a filter 40 to the engine itself. The engine may be a diesel type, and in that case a reservoir 42 is associated with a fuel injector means for the diesel engine. With the mechanical fuel pump 38 operating, fuel is drawn through the passageway defined by the hose 18, the conduit 34, a passageway through the solenoid valve 32, and the conduit 36 which is interrupted by a conventional filtering means 40. Thus, the operation of the switch 24 to the contact 26 provides for a direct delivery of fuel to a reservoir 42 of the engine, and the fuel delivery is effected by the operation of the usual fuel pump 38 associated with the engine. The fuel pump 38 may be a gear pump type of construction capable of developing relatively high pumping pressures (for example, up to 160 pounds of pressure) in order to ensure a sufficient delivery of fuel for not only supplying engine needs but also for refilling the tanks 14 carried by the tractor vehicle. Since an excess of fuel is being delivered to the reservoir 42, a provision is made for overflowing the excess through a conduit 44, through a pressure sensing and switching device 46, and into a conduit 48 which empties into the fuel tank 14. The transfer of fuel from the larger capacity tank continues until the small capacity tractor tanks have been filled. The filling of the tractor tanks can be observed with a conventional gauge by the driver, and upon completing the fill, the driver can actuate the switch 24 to an off position to stop the transfer. When the switch 24 is turned to an off position, the solenoid valve 32 is actuated to open a passageway between the small capacity fuel tank and to the fuel pump 38 of the internal combustion engine. During the normal transfer of fuel from the small capacity tank, fuel is drawn through the conduit 49, through the solenoid valve 32, and then to the engine by way of the conduit 36. Should the driver overlook the completion of fill for the small capacity tanks on the tractor, the pressure sensing device 46 will automatically detect a build-up of pressure within the system and cause a switch to actuate the solenoid valve to a position for delivering fuel to the engine by way of the conduit 49. The device 46 may be set to actuate the valve when a relatively low pressure (for example, 4½–7½ pounds pressure) builds up within the tank, thereby preventing a possible rupture of the tank. When the solenoid valve is actuated to open up the passageway between the conduits 49 and 36, the passageway between the conduits 34 and 36 is closed.

An alternative way of operating the system in FIG. 2 is to fill the small capacity tank directly without first passing the fuel to a reservoir or injection system associated with the engine. TO operate the system in this manner, the driver manually moves the switch 24 to the contact 50, and this actuates an electric pump 54. When the electric pump is operating, an indicator light 52 is lighted to provide a signal to the driver. The electric pump 54 may be of a vibrator type which automatically cuts off at a given pressure level (for example, at 6 pounds of pressure). When contact 50 is closed by the switch 24, it is of course understood that the circuit 30 is broken, and therefore the solenoid valve 32 closes the previously described passageway for interconnecting the conduits 34 and 36. With the electric pump 54 operating, fuel is drawn from the large capacity auxiliary tank through the flexible hose 18, and then the fuel is pumped through the conduit 56 for dumping into the small capacity fuel tank 14 by way of the conduit 48. When the small capacity fuel tank is filled by this method, the driver can disconnect the switch 24 to stop the operation of the pump 54, but if the filling of the tank is overlooked, the pump will automatically shut off in response to a build-up of a predetermined amount of pressure (6 pounds for example). During the filling process by the alternative method just described, the engine may continue to operate by drawing fuel from the small capacity tank 14 through the regular supply system which includes the conduits 49 and 36. Thus, if the electric pump should be automatically stopped because of a build-up of pressure, there will be no impairment of the continued operation of the internal combustion engine for the tractor. Also, it should be noted that the electric pump 54 may serve as a priming pump for the system, and if the solenoid valve 32 should become inoperative (such as being stuck in a position for delivery only from the small tank) the driver can operate the pump 54 to maintain a delivery of fuel from the auxiliary tank.

FIG. 3 illustrates a system which automatically maintains a predetermined level of fuel in the small capacity tanks of a tractor unit. The fuel level is maintained by a float valve which is included in the system to operate the transfer of reserve fuel from the large auxiliary tank carried on the trailer. In the illustrated system, fuel is normally transferred from the small capacity tank 14 to the diesel fuel injector 42 by way of the conduits 49 and 36. This transfer of fuel is accomplished by the action of a mechanical fuel pump 38 associated with the engine and driven thereby. Further, a filter 40 may be included in the fuel feeding system. The level of fuel in the tank 14 may be maintained by an automatic system which transfers fuel from the large tank 16 of the trailer to the small tank 14. This transfer takes place through the flexible conduit 18, through an electric pump 62, a conduit 64, and a float valve device 66 which includes a discharge conduit into the small capacity tank 14. The electric pump 62 is operated by closing the ignition switch 20 together with the separate switch 24 which completes a circuit to the electric pump 62. When the circuit is completed an indicator light 28 provides a signal to the driver, and the pump 62 is in a condition for operation. Actual operation of the pump 62 is determined by the position of a float contained within the float valve 66. The float valve device is completely conventional in its construction, and includes a floating member which can move to positions which activate and deactivate a circuit 68. When the float within the valve 66 is in a predetermined lower position, the circuit 68 is completed for permitting the pump 62 to operate. Such a position would be below a predetermined desired level of fuel for the tank 14. The float valve 66 can be adjustable so that the fuel level in the tank 14 can be adjusted to desired requirements. The upper level of fuel for the tank is illustrated (by way of example) by the dashed line 70, and a range of the adjustment positions for the float valve is indicated by 72—72. When the float member within the valve 66 reaches an uppermost position, which determines the upper level of fuel for the capacity tank 14, the circuit 68 is disconnected to shut down the operation of the electric pump 62. Thus, the pump 62 is operated on and off in response to the fuel level conditions within the fuel tank 14, and the driver may leave the switch 24 closed to maintain the entire system in a condition for continued automatic operation.

Any of the systems described for FIGS. 2 and 3 can be shut down to permit a disconnection of the valve line 18 from a trailer unit. The flexible hose 18 has a quick disconnect coupling at one end in order that it may be quickly coupled or disconnected from the conduit leading from the auxiliary tank of the trailer. The coupling is of a conventional design and is the type of connection which opens a flow passage when connected, while automatically sealing the conduit ends when disconnected. This feature permits the tractor unit to be disconnected from the trailer while fuel is stored in the large capacity tank of the trailer, and of course, the tractor unit can be operated completely independently of the trailer unit.

Although this invention has been described with reference to particular embodiments, it will be understood that variations in the system and in components used with the system are to be included within the scope of the invention.

What is claimed is:

1. In a fuel supply system for supplying fuel to an engine of a motor vehicle which is articulated to a trailer, the improvement comprising the combination of:

at least one small-capacity fuel tank carried by said motor vehicle for containing an initial supply of fuel which can be supplied to said engine, and including a first fuel pump means for pumping fuel from said small-capacity fuel tank to a point of consumption for said engine, separate fuel tank means carried by said trailer for storing a relatively large supply of auxiliary fuel which can be transferred either to said small-capacity fuel tank or to said engine, and transferring means for removing fuel from said separate fuel tank means, said transferring means including:

conduit means for carrying fuel from said separate fuel tank means, said conduit means including a flow path for carrying fuel directly to said engine without first going through said small-capacity fuel tank, and wherein said first fuel pump means comprises the sole pumping means for pumping fuel to the engine from said small-capacity fuel tank and from said separate fuel tank means, manual control means for opening a valve means connected to said conduit means from said separate fuel tank means for delivering fuel from said separate fuel tank when said initial supply of fuel has been depleted, second pump means for selectively transferring fuel from said separate fuel tank to said small-capacity fuel tank, and reservoir means associated with a fuel injector means of the engine for receiving fuel delivered from the separate fuel tank, overflow means connected to said reservoir means and to said small-capacity fuel tank for returning to said small-capacity fuel tank any excess of fuel which may be delivered to said reservoir, and control means for controlling the transfer of fuel from said separate fuel tank means.

2. The system of claim 1 wherein said transferring means carries fuel from said separate fuel tank and into said small-capacity fuel tank carried by the motor vehicle, and including a manual control means operable by an occupant of said vehicle to turn said second pumping means on and off to maintain a desired quantity of fuel in said small-capacity fuel tank for consumption by the engine of the vehicle.

3. The system of claim 1 wherein said control means includes a manual switch which can be opened and closed to operate the transferring means, said switch being included in an ignition circuit for said vehicle so that the transferrinG means can be operated only when the ignition circuit of said vehicle is completed.

4. The system of claim 1 wherein said valve means connected to the conduit means includes two passageways, a first passage connected to said conduit means for delivering fuel from the separate fuel tank to said engine, and a second passage connected to additional conduit means for delivering fuel from the small-capacity tank to said engine, said valve means being operational to provide a fuel delivery through only one of said passages at a time.

5. The system of claim 1 wherein said second fuel pump comprises an electric pump means, and wherein said first fuel pump means comprises a mechanical pump.

6. In a fuel supply system for supplying fuel to an engine of a motor vehicle which is articulated to a trailer, the improvement comprising the combination of:

at least one small-capacity fuel tank carried by said motor vehicle for containing an initial supply of fuel which can be supplied to said engine, and including a first fuel pump means as the sole pumping means for pumping fuel from said small-capacity fuel tank to a point of consumption for said engine separate fuel tank means carried by said trailer for storing a relatively large supply of auxiliary fuel which can be transferred either to said small-capacity fuel tank or to said engine, transferring means for removing fuel from said separate fuel tank means, said transferring means including:

conduit means for carrying fuel from said separate fuel tank means, said conduit means having a flow path for carrying fuel directly to said engine without first going through said small-capacity fuel tank, control means including a manual control means for opening a valve means connected to said conduit means for delivering fuel from said separate fuel tank means when an initial supply of fuel has been depleted, said valve means having two passageways: (a) a first passageway communicating with said conduit means for delivering fuel from the separate fuel tank to said engine, and (b) a second passageway communicating with additional conduit means for delivering fuel from the small-capacity tank to said engine, said valve means being operational to provide fuel delivery through only one of said passageways at a time, pressure sensing means to shut-off the transfer of fuel through said first passageway in said valve means when the small-capacity fuel tank is full and to simultaneously open up said second passageway for delivery of fuel to the engine from the small-capacity tank, and second pump means for selectively transferring fuel from the separate fuel tank to the small-capacity fuel tank, reservoir meanS associated with a fuel injector means of the engine for receiving fuel delivered from the separate fuel tank, and overflow means connected to said reservoir means and to said small-capacity fuel tank for returning to said small-capacity fuel tank any excess of fuel which may be delivered to said reservoir means.

* * * * *